(12) United States Patent
Chen

(10) Patent No.: US 11,048,340 B2
(45) Date of Patent: Jun. 29, 2021

(54) VR WALKING MECHANISM AND METHOD FOR WALKING IN VR SCENE

(71) Applicant: Zhaosheng Chen, Beijing (CN)

(72) Inventor: Zhaosheng Chen, Beijing (CN)

( * ) Notice: Subject to any disclaimer, the term of this patent is extended or adjusted under 35 U.S.C. 154(b) by 0 days.

(21) Appl. No.: 16/756,470

(22) PCT Filed: Nov. 14, 2018

(86) PCT No.: PCT/CN2018/115418
§ 371 (c)(1),
(2) Date: Apr. 16, 2020

(87) PCT Pub. No.: WO2019/096160
PCT Pub. Date: May 23, 2019

(65) Prior Publication Data
US 2021/0117013 A1    Apr. 22, 2021

(30) Foreign Application Priority Data
Nov. 16, 2017   (CN) .......................... 201711140756.6

(51) Int. Cl.
*G06F 3/033*      (2013.01)
*G06T 19/00*      (2011.01)
(Continued)

(52) U.S. Cl.
CPC ............ *G06F 3/0334* (2013.01); *G06F 3/011* (2013.01); *G06F 3/0346* (2013.01); *G06T 19/006* (2013.01)

(58) Field of Classification Search
CPC ...... G06F 3/0344; G06F 3/011; G06F 3/0346; G06T 19/006
See application file for complete search history.

(56) References Cited

U.S. PATENT DOCUMENTS 5,872,438 A    2/1999  Roston
5,913,684 A *  6/1999  Latham .................. G06F 3/011
                                                    434/247
(Continued)

FOREIGN PATENT DOCUMENTS

CN       104461018 A    3/2015
CN       105892626 A    8/2016
(Continued)

OTHER PUBLICATIONS

Ferdaus Kawsar, et al., Identifying Phases of Gait and Development of Walking Model from Pressure and Accelerometer Data and It's Ramifications in Elderly Walking, Inclusive Society: Health and Wellbeing in the community, and Care at Home, 2013, pp. 273-279, Springer.

*Primary Examiner* — Ariel A Balaoing
(74) *Attorney, Agent, or Firm* — Bayramoglu Law Offices LLC

(57) ABSTRACT

A VR walking mechanism includes a first pedal, a second pedal, a sensing device, a control device and a driving device. The first pedal and the second pedal are connected to the driving device, respectively. The sensing device is configured to obtain motion information of a first object and/or a second object and send the motion information to the control device. The control device determines a predicted landing point of the first object and/or the second object based on the motion information and controls the driving device according to the predicted landing point so as to drive the first pedal and/or the second pedal to move to the corresponding position. The first pedal and/or the second pedal resets after sensing that the first object and/or the second object has stepped thereon. A VR walking method corresponding to the VR walking mechanism is further provided.

7 Claims, 5 Drawing Sheets

(51) Int. Cl.
    *G06F 3/01*           (2006.01)
    *G06F 3/0346*       (2013.01)

(56) References Cited

U.S. PATENT DOCUMENTS

| | | | | |
|---|---|---|---|---|
| 5,980,256 | A * | 11/1999 | Carmein | A63B 22/02 |
| | | | | 434/29 |
| 6,050,822 | A * | 4/2000 | Faughn | G06F 3/011 |
| | | | | 345/952 |
| 6,123,647 | A * | 9/2000 | Mitchell | A63B 22/02 |
| | | | | 198/456 |
| 2007/0171199 | A1 * | 7/2007 | Gosselin | A61H 3/008 |
| | | | | 345/156 |
| 2010/0238110 | A1 * | 9/2010 | Prushinskaya | A63F 13/212 |
| | | | | 345/156 |
| 2011/0009241 | A1 | 1/2011 | Lane et al. | |
| 2020/0078251 | A1 * | 3/2020 | Benda | A63B 21/0058 |

FOREIGN PATENT DOCUMENTS

| | | |
|---|---|---|
| CN | 107943289 A | 4/2018 |
| WO | 2008123818 A1 | 10/2008 |

* cited by examiner

VR WALKING MECHANISM AND METHOD FOR WALKING IN VR SCENE

CROSS REFERENCE TO THE RELATED APPLICATIONS

This application is the national phase entry of International Application No. PCT/CN2018/115418, filed on Nov. 14, 2018, which is based upon and claims priority to Chinese Patent Application No. 201711140756.6, filed on Nov. 16, 2017, the entire contents of which are incorporated herein by reference.

TECHNICAL FIELD

The present invention relates to the technical field of virtual reality (VR), and more particularly, to a device and a method for simulating walking in a VR scene.

BACKGROUND

Virtual reality (VR) technology is an important developmental direction of modern simulation technology. People feel the same when experiencing VR technology as they do in the real world because VR produces the same feedback information to the brain and sensory receptors as that produced in the real world. With the rapid development of the many technologies associated with VR, including display technology, graphics and image processing technology, multimedia technology, tracking technology, parallel processing technology, the application of VR technology has gradually expanded and is now employed in many fields.

In the typical VR system, the actions to be completed in real life by human limbs should also be possible to accomplish by humans through human-computer interaction. Huge progress has been made in existing VR technology in terms of environment generation and display, surround sound and other aspects. The input device of the VR technology, namely driving devices manipulated during human-computer interaction and detection devices for detecting hand and arm movements, have made dramatic improvement in practical application. There is no solution in VR, however, for optimally reproducing the look, feel and appearance of walking, which is one of the indispensable actions performed by humans.

A VR walking mechanism is a problem to be solved in the industry, and the purpose of the VR walking mechanism is to mirror the appearance of the user when walking in the real world, showing the movements and behaviors of the user, such as moving forward, moving backward, making turns, the normal bodily responses to such movements and so on.

The size of VR device is usually very limited, so the walking mechanism is also limited in size. FIG. 1 shows a schematic diagram of a VR walking mechanism provided by the prior art. As shown in FIG. 1, the prior art VR walking mechanism includes the smooth concave platform 20' and a cross beam 30' above the concave platform 20'. The cross beam 30' is configured to set the safety rope 10' and the concave platform 20' includes the concave countertop 21'. The user 100' wears the safety rope 10', walks in the middle portion of the concave countertop 21' and performs in-situ sliding.

A sensor is arranged under the surface of the countertop 21' (not shown in the figure), and the sensor can sense the position of the two feet of the user 100', thereby reflecting the way the user walks in the virtual world. When the user moves forward, for example, the left foot and the right foot are essentially facing in the same direction, and the user walks step by step sequentially with two feet. Because the countertop is smooth, however, the user glides, that is, the foot returns to the original position after stepping out, which reflects that the user is moving forward. When the user turns left, the left foot deflects by a certain angle, and then the right foot deflects accordingly, which reflects that the user turns left in the VR scene. The situations of turning right and moving backward are similar.

Such physical prior art devices, however, are defective in that they are especially slippery. This is not a trivial shortcoming. Rather, it causes the user to feel totally off-kilter when gliding in the VR scene than when walking in the real world, which results in a particularly unnatural feeling when walking on the physical VR countertop. Additionally, the frictionless countertop is so slippery that it poses a risk of physical harm to the user even if the user wears a safety rope.

SUMMARY

The present invention provides a VR walking mechanism which can simulate real walking. In order to achieve the objective, the present invention adopts the following technical solution.

The embodiment of the present invention provides a VR walking mechanism, including:

a first pedal, a second pedal, a sensing device, a control device and a driving device, wherein the first pedal and the second pedal are connected to the driving device, respectively;

the sensing device is configured to obtain motion information of a first object and/or a second object and send the motion information to the control device, and the motion information includes position information; and the control device determines a predicted landing point of the first object and/or the second object based on the motion information, and controls the driving device according to the predicted landing point to drive the first pedal and/or the second pedal to move to a corresponding position.

According to the VR walking mechanism described in the above solution, the first pedal and/or the second pedal resets after sensing that the first object and/or the second object steps thereon.

According to the VR walking mechanism described in any of the above solutions, each of the first pedal and the second pedal is controlled by a driving device to move in a plane or in a three-dimensional space.

According to the VR walking mechanism described in any of the above solutions, the driving device corresponding to the first pedal or the second pedal includes a motor, a lead screw and a connecting member, wherein the connecting member is connected to the first pedal or the second pedal, and the control device can send a control signal to the motor to drive the first pedal or the second pedal to move according to the control signal.

According to the VR walking mechanism described in any of the above solutions, the sensing device includes a position detection unit and pressure detection units, wherein the pressure detection units are installed on the first pedal and the second pedal, respectively; the control device obtains force information detected by the pressure detection units and determines the predicted landing points of the first object and the second object in combination with the motion information of the first object and the second object.

According to the VR walking mechanism described in any of the above solutions, the VR walking mechanism further includes a rotation mechanism respectively corresponding to the first pedal and the second pedal, and the first pedal and the second pedal rotate through the rotation mechanism in response to a command from the control device.

According to the VR walking mechanism described in any of the above solutions, the sensing device is inherently provided with an attitude sensing function or further includes an attitude sensor to sense attitude information of the first object and the second object.

The embodiment of the present invention further provides a walking method applied to a VR scene, including:

obtaining motion information of a first object;

determining a predicted landing point of the first object according to the motion information of the first object;

driving a first pedal to move to a position corresponding to the predicted landing point of the first object;

after sensing that the first object contacts the first pedal, resetting the first pedal;

after sensing that a second object is detached from a second pedal, obtaining motion information of the second object;

determining a predicted landing point of the second object according to the motion information of the second object;

driving the second pedal to move to a position corresponding to the predicted landing point of the second object; and after sensing that the second object contacts the second pedal, resetting the second pedal.

According to the method described in the above solution, before the step of determining the predicted landing point of the first object according to the motion information of the first object, the method further includes:

obtaining a force acting on the first pedal;

then, the step of determining the predicted landing point of the first object according to the motion information of the first object includes:

predicting a motion trajectory of the first object according to the obtained force, position information and corresponding time information in the motion information of the first object to obtain the predicted landing point.

Before the step of determining the predicted landing point of the second object according to the motion information of the second object, the method further includes:

obtaining a force acting on the second pedal;

then, the step of determining the predicted landing point of the second object according to the motion information of the second object includes:

predicting a motion trajectory of the second object according to the obtained force, position information and corresponding time information in the motion information of the second object to obtain the predicted landing point.

According to the method described in any of the above solutions, before sensing that the first object contacts the first pedal, the method further includes:

calculating a deflection angle of the first object according to position information and attitude information in the motion information of the first object; and deflecting the first pedal by the deflection angle.

Before sensing that the second object contacts the second pedal, the method further includes:

calculating a deflection angle of the second object according to position information and attitude information in the motion information of the second object; and deflecting the second pedal by the deflection angle.

As can be known from the above, the embodiments of the present invention provide a VR walking mechanism and a walking method applied to a VR scene. In the embodiments of the present invention, the landing points of the objects are obtained by the sensing device, and the first pedal and the second pedal are respectively driven by the driving mechanisms to move according to the landing points to catch the objects. The present invention simulates the feeling of real walking, improves the sense of reality in use, and ensures the safety of the user at the same time.

In an optional embodiment, each pedal of the present invention corresponds to a driving device, so that the first pedal and the second pedal can move without interfering with each other.

In an optional embodiment, the VR walking mechanism provided by the embodiment of the present invention can be provided with various sensors, which can accurately obtain the positions of the feet of the user, thereby improving the calculation accuracy and further increasing the reality for the user. Meanwhile, the VR walking mechanism can be provided with a safety rope to assist in ensuring the safety of the user.

Details of one or more embodiments of the present invention are described in the drawings and the specific embodiments. According to the drawings, specific embodiments and the contents recited in the claims, other features and advantages will be obvious.

The above description is only an overview of the technical solution of the present invention. In order to make the technical means of the present invention clear to understand and implement in accordance with the contents of the specification, and in order to make the above and other objectives, features and advantages of the present invention more obvious and lucid, the specific embodiments of the present invention are described as follows.

BRIEF DESCRIPTION OF THE DRAWINGS

In order to more clearly illustrate the technical solutions in the embodiments of the present invention or in the prior art, the drawings used in the description of the embodiments or the prior art are briefly introduced below. Obviously, the drawings described below are some embodiments of the present invention, and for those skilled in the art, other drawings can be obtained according to these drawings without creative work.

DETAILED DESCRIPTION OF THE EMBODIMENTS

In order to make the objective, technical solution and advantages of the embodiments of the present invention clearer, the technical solutions in the embodiments of the present invention are described clearly and completely below in combination with the drawings in the embodiments of the present invention. Obviously, the described embodiments are parts of the embodiments of the present invention, rather than all of the embodiments. Based on the embodiments of the present invention, all other embodiments obtained by those skilled in the art without creative efforts shall fall within the scope of protection of the present invention.

The present invention can be implemented in many ways, for example, as a device, a method, a computer program product. In general, the order of the steps of the process disclosed within the scope of the present invention may be changed unless otherwise stated.

A detailed description of the embodiments of the present invention is provided below in conjunction with the drawings illustrating the principles of the present invention. Although the present invention is described in conjunction with such embodiments, the present invention is not limited to any embodiment. Many specific details are stated in the following detailed description in order to provide a thorough understanding of the present invention. The details provided are intended to illustrate the present invention, but the present invention may be practiced in accordance with claims without some or all of these specific details. For clarity, the techniques known in the technical field relating to the present invention are not described in detail to highlight the focus of the present invention.

Figure 1:
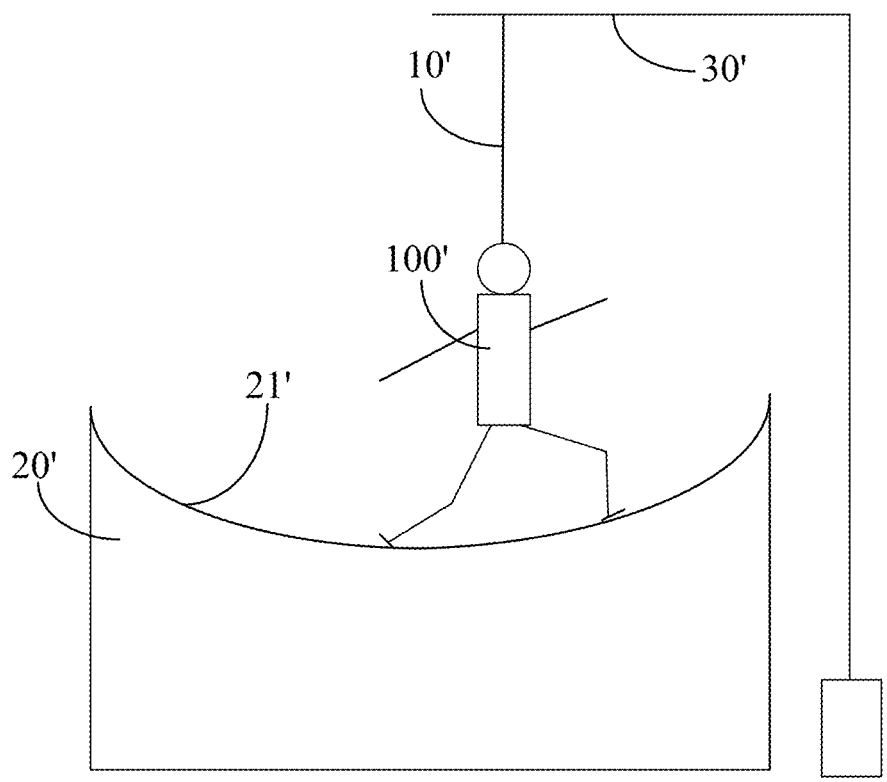
FIG. 1 shows a schematic diagram of a VR walking mechanism in the prior art.
Figure 2:
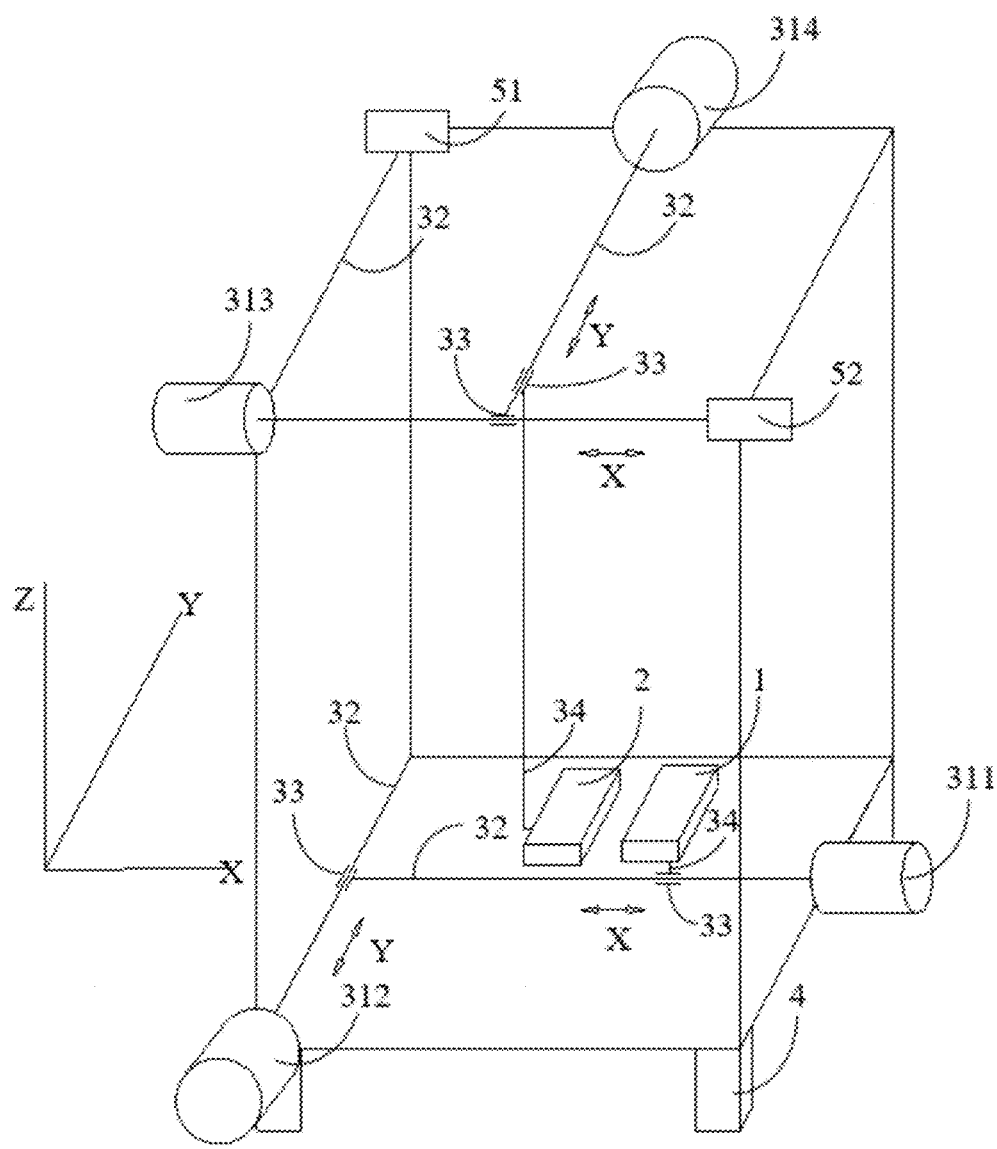
FIG. 2 shows a schematic diagram of the main structure of the VR walking mechanism provided by an embodiment of the present invention.

The present invention provides a VR walking mechanism. As shown in FIG. 2, the VR walking mechanism includes the first pedal 1 and the second pedal 2. The first pedal 1 and the second pedal 2 are used for the objects to step thereon. The objects may be the left and right feet of the user (see label 100 of FIG. 3), or devices worn on the left and right feet, etc., which is not shown in the figures. The first pedal 1 and the second pedal 2 are connected to the driving device, respectively, so that the pedals 1 and 2 are driven by the driving device to move in the space.

In one embodiment, the driving device may include the motors 311-314, the lead screw 32, the nut 33 and the connecting member 34, and is configured to drive the pedal to move in the three-dimensional space in order to reach a desired position. It is worth noting that in the VR walking mechanism, the number of pedals is not limited to two, it is also possible to arrange less than or more than two pedals, and two pedals are taken as an example for illustration in the figure. The direction of the movement is shown in FIG. 2, and each pedal can move along the X direction and the Y direction, so as to move to any position in the plane defined by the X direction and the Y direction.

In addition, in other embodiments, the pedal can move not only in the plane, but also in the three-dimensional space. For example, the first pedal 1 and the second pedal 2 can move in the plane defined by the X direction and Y direction, or in the three-dimensional space defined by the X direction, Y direction and Z direction, which is not limited herein.

In the present embodiment, the first pedal 1 is taken as an example to illustrate how the driving device drives the first pedal 1 to move. As shown in FIG. 2, the motor of the driving device is, for example, a stepper motor. When the stepper motor 311 receives the control signal of moving in the X direction, the stepper motor 311 outputs the torque to drive the lead screw 32 connected to the stepper motor 311 to rotate, correspondingly, the nut 33 connected to the lead screw 32 moves in the X direction and thus drives the first pedal 1 to move in the X direction through the connecting member 34. When the stepper motor 312 receives the control signal of moving in the Y direction, the stepper motor 312 outputs the torque to drive the lead screw 32 connected to the stepper motor 312 to rotate, correspondingly, the nut 33 connected to the lead screw 32 moves in the Y direction and thus drives the first pedal 1 to move in the Y direction by the lead screw 32.

In the above structure, as shown in FIG. 2, one end of the lead screw 32 used for moving in the X direction is connected to the motor 311, the other end of the lead screw 32 is the nut 33, and the nut 33 cooperates with the lead screw 32 used for moving in the Y direction, so that the motor 311 and the lead screw 32 can move in the Y direction as a whole. When moving in the Y direction, the motor 311 may, for example, be slidably arranged in the VR walking mechanism, and move in the Y direction as a driven member along with the lead screw 32 connected to the motor 311.

However, as those skilled in the art know, the motor, lead screw and nut described above are only one embodiment of the driving device, and those skilled in the art can replace them with any device that can drive the first pedal and the second pedal to move, which are not limited here.

In one embodiment, the VR walking mechanism further includes a control device, and the control device can be any control device that can carry out motion calculation and motion estimation according to the three-dimensional coordinates of the pedal, such as microprocessor, microcontroller, system-on-chip (SoC), integrated circuit, complex programmable logic device (CPLD), field programmable gate array (FPGA), digital signal processor (DSP), gate circuit, discrete electronic device and others. The control device can communicate with the driving device, for example, the control device can perform a wire or wireless communication with the driving device through any communication means such as twisted pair, electronic circuit, radio frequency, wireless fidelity (WiFi), and others. That is, the control device and the driving device may be respectively provided with a communication module or a signal channel for the wire or wireless communication. The ways of achieving communication between the control device and the driving device is not particularly limited by the present invention.

In one embodiment, the VR walking mechanism further includes the sensing devices 51, 52. As shown in FIG. 2, the sensing devices may, for example, be arranged at the two top diagonal corners of the VR walking mechanism, which are configured to scan the corresponding area of the VR walking mechanism, obtain motion information of the first object (e.g., the user's left foot) and/or the second object (e.g., the user's right foot), and send the motion information to the control device.

In one embodiment, the motion information may include, for example, position information of the first object and the second object (e.g., two-dimensional coordinate information or three-dimensional coordinate information). Specifically, the position information A (x, y, z) of a specific point of the user's left foot (or right foot), or the position information B (x1, y1, z1), C (x2, y2, z2), D (x3, y3, z3) of some specific points of the user's left foot (or right foot) is obtained. Then these points B, C, D are used to simulate the shape and attitude of the user's left foot (or right foot). In other embodiments, the sensing device may further include a pressure sensor, which is configured to obtain force information of the first object and the second object (e.g., pressure information of one pedaling). In other embodiments, the control device may further calculate the velocity information of the first object and the second object through the position information of the first object and the second object in combination with the time information. In other embodiments, the motion information may include force information between the first object and the first pedal, and force information between the second object and the second pedal. In addition, the motion information may further include time information corresponding to the position information and the force information.

In one embodiment, according to the position information of different points on the first object and the second object obtained by the sensors, the attitude of the first object and the second object can be simulated by the control device, which means that the orientation of the objects can be determined in real time, that is, the sensing devices can sense the direction in which the objects are traveling in real time, namely, moving forward, moving backward, making turns and other actions. For example, as shown in FIG. 2, the sensors numbered 51 and 52 are arranged at two diagonal vertices of the space where the VR walking device is located for capturing the positions of the first object and the second object.

Specifically, the sensing device may include, for example, a variety of sensors as follows, and the motion information can be obtained in a variety of ways.

For example, the sensing device may be a three-dimensional measuring device. The three-dimensional measuring device can sense the three-dimensional profile of the object and determine the center of gravity of the object, and then the speed of the object in real time can be calculated in combination with the measured time in the control device, thereby estimating the motion trajectory of the object. Besides, the landing point of the object is determined in combination with the various information (e.g., the information presented to the user in the virtual reality scene, the priori information about the motion trajectory of the motion object). For example, when a user is about to climb a step in a virtual reality environment, the user will raise the left foot or the right foot, while the motion trajectory of the foot of the human in the process of climbing the step may be priori known, so in this scene, according to the motion information of the object collected by the sensing devices, the motion trajectory of the object is accurately estimated in combination with the scene information (e.g., the height of the step, etc.) of the step in virtual reality environment and the priori information of the foot movement, and then the landing point of the object is determined, that is, the desired position to which the upper surface of the pedal should be moved and the object can step on the pedal.

In one embodiment, the pedal of the VR walking mechanism is provided with an attitude sensor. The attitude sensor may be an inertial sensor and can measure the acceleration and the attitude of the pedal and send the measurement data to the control device in real time for predicting the motion trajectory of the pedal. The inertial sensor includes, for example, an accelerometer, an angular velocity sensor and an inertial measurement unit formed by combining any of a uniaxial accelerometer, a biaxial accelerometer, a triaxial accelerometer, a uniaxial angular velocity sensor, a biaxial angular velocity sensor and a triaxial angular velocity sensor.

In one embodiment, the VR walking mechanism further includes a shoe cover carrying a position tag, for example, a shoe cover integrated with a position sensor. The user can put the feet into the shoe covers, the feet is positioned through the positioning of the shoe cover, so as to measure the marching pace of the user.

The sensing device may also be a computer vision measuring device, which measures the three-dimensional position of the object by imaging a position tag point attached to the object (or the shoe cover). The sensing device may also be binocular measuring device, monocular measuring device, structured light measuring device and others.

Figure 3:
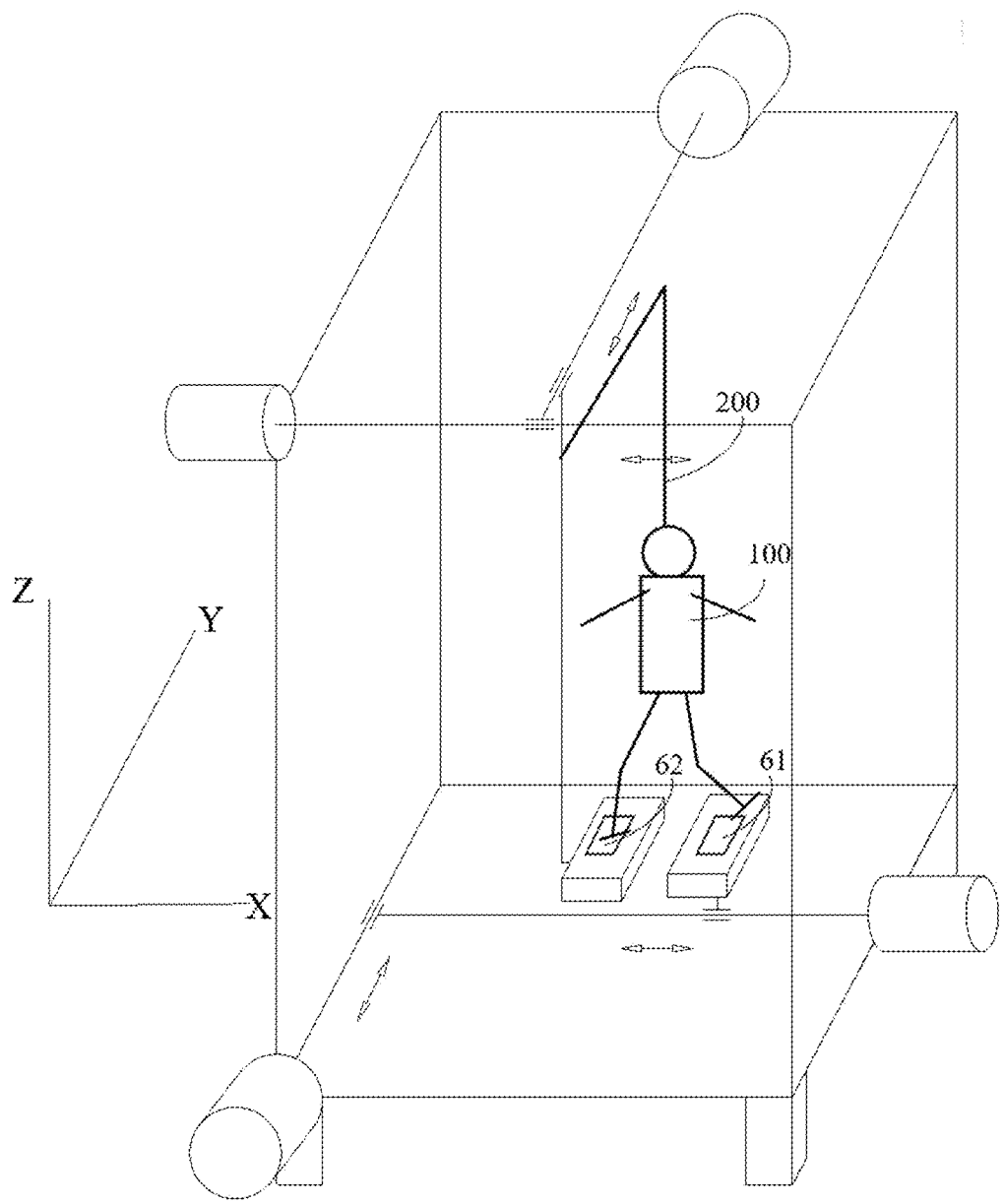
FIG. 3 is a schematic diagram showing the safety rope and a part of the sensing devices of the VR walking mechanism provided by an embodiment of the present invention.

In one embodiment, as shown in FIG. 3, the sensing device may include the pressure detection units 61, 62 mounted on the pedals. The pressure detection units can detect the force between the objects on the pedals and the pedals, and send the information related to the force to the control device. After receiving the force information, the control device predicts the motion of the object in combination with the motion information of the object. Specifically, the pressure detection unit may be one or more pressure sensors, which is usually composed of a pressure sensitive element and a signal processing element. The pressure detection unit can sense the pressure signal, convert the pressure signal into an available output electrical signal according to a certain law, and output the available output electrical signal to the control device. The pressure sensor may be a piezoresistive force transducer, a ceramic pressure transducer, a diffused silicon pressure transducer, a piezoelectric pressure transducer and others. After receiving the pressure signal from the pressure detection unit, the control device determines the weight applied by the object on the pedal.

For example, by continuously collecting the pressure signals, the controller can measure the weight of the current user for subsequent calculations. When the pressure signals collected by the controller increase, it shows that the object is gradually transferring the center of gravity to the pedal, and when the pressure signals collected by the controller decrease, it shows that the object is gradually leaving the pedal. This information can be used to help predict the motion trajectory of the object and identify the behavior pattern of the object. For example, if the pressure signal received by the controller indicates that the pressure on the first pedal 1 is increasing, it means that the user is stepping on the first pedal 1, and when the pressure on the first pedal 1 is close to the weight of the user, it means that the other object (the other foot of the user) may be about to leave the other corresponding second pedal 2. In this case, if the first pedal 1 is in front of the second pedal 2, it indicates that the user may be moving forward, and if the first pedal 1 is behind the second pedal 2, it indicates the user may be moving backwards. If the two pedals are in the side-by-side positions close to each other, and the pressure on the first pedal 1 and the pressure on the first pedal 2 are close, it indicates the user may be standing still and not ready to move.

It is worth noting that the pressure sensor can also be set to judge the attitude of an object stepping on a corresponding pedal. For example, the data are collected by the pressure sensors distributed densely on the pedal to determine the orientation of the object, such as, an angle between the object and the moving direction when the object steps on the pedal, and the angle is used to determine whether the object is deflecting or not.

In one embodiment, each of the pedals 1 and 2 is also provided with a rotation mechanism (not shown in the figure), for example, the rotation mechanism may be arranged between the first pedal 1 and the connecting member 34, and between the second pedal 2 and the connecting member 34, so that the pedals 1 and 2 can rotate within 360 degrees in response to a command from the control device. The rotation mechanism can be a known rotation mechanism in the field of mechanical design, such as screw-type rotation mechanism, cam-type rotation mechanism, crank-type rotation mechanism, hinge-type rotation mechanism, link-type rotation mechanism, four-bar mechanism and others. When the sensing device determines that the object has a certain angle relative to the moving direction, the pedal 1 or 2 corresponding to the object (stepping on the pedal) can also rotate by a corresponding angle under the control of the controller to accommodate the object, that is, the pedal can be adapted when the object (the user) is deflecting.

In one embodiment, as shown in FIG. 3, each VR walking mechanism may also be provided with the safety rope 200 to further ensure the safety of the user 100. As shown in FIG. 2, the VR walking mechanism may further include the supporting foot 4 for supporting the VR walking mechanism on the ground.

The present invention further provides a walking method applied to the VR scene. In one embodiment of the present invention, the pedal is initially located at the origin of the coordinate system (which can be defined by the developer or the user and can be defined as the origin of the three-dimensional coordinate system). Before or when the user is ready to walk in the VR environment, the position and the attitude of the object of the user are sensed to obtain the coordinates of the object, or the coordinates and the orientation of the object.

For example, the object (e.g., the left foot or the right foot of the user) can be modeled as a rectangle, and the direction of the long side of the rectangle can be considered as the same as the moving direction of the user. For example, when the position of the first object (the left foot) is captured and the landing point of the left foot is predicted, the left pedal is sent to the predicted landing point of the left foot, and then, after the left foot steps on the pedal, the left pedal resets to the position near the origin. Similar operations can be repeated for the right foot.

Alternatively, in one embodiment, when the object (the left foot or the right foot) is stepping on the pedal, the pressure on the pedal is sensed, and when the pressure is greater than a first threshold (e.g., ½ of the weight of the user), the user of the VR walking system is determined to have stepped on the pedal. When the pressure is greater than a second threshold (e.g., ⅔ of the weight of the user), the user of the VR walking system is determined to have basically shifted the center of gravity to the pedal, which means that the other foot of the user may leave the other pedal at any time. In addition, when the pressure on the former pedal in the moving direction is detected to be gradually increasing, it indicates that the user of the VR walking system is moving forward, and when the pressure on the former pedal in the moving direction is detected to be gradually decreasing, it indicates that the user of the VR walking system is moving backward. Similarly, when the pressure on the latter pedal in the moving direction is detected to be gradually increasing, it indicates that the user of the VR walking system is moving backward, and when the pressure on the latter pedal in the moving direction is detected to be gradually decreasing, it indicates that the user of the VR walking system is moving forward. In this way, the back and forth movement (for example, when the user of the VR walking system moves in a virtual environment in which the danger may be hidden) of the user of the VR walking system can be accurately determined in real time.

In one embodiment, when the sensing device detects that a certain angle appears between the orientation of the object and the moving direction, it indicates that the user intends to deflect. For example, when the user is determined to be moving forward, the orientation of the left foot in the air diverts by 30 degrees to the left relative to the moving direction, the pedal corresponding to the left foot also diverts by 30 degrees accordingly. After the predicted landing point is determined, the pedal corresponding to the left foot is moved near the predicted landing point. In this process, the angle change can be performed in any way or subjected to any process as long as the orientation of the pedal corresponding to the left foot at the predicted landing point diverts by 30 degrees to the left relative to the moving direction before the left foot is stepped on the pedal. After that, the force on the pedal corresponding to the left foot is continuously detected, and if the force increases monotonously from zero, it indicates that the user is completing the walking action of turning to the left. When the force is greater than a certain threshold or close to the weight of the user (which is equivalent to that the force on the other pedal is less than a certain threshold or close to zero), the pedal corresponding to the left foot is moved to the position near the origin at a speed matched with the walking speed. If the force increases from zero and then decreases but does not decrease to zero, it indicates that the user may be hesitating and has not yet decided to move forward, and at this time, the pedal corresponding to the left foot should not be withdrawn but kept still. If the force increases from zero and then decreases to zero (the left foot of the user has left the pedal), the position and the orientation of the left foot are continuously obtained by the sensing device and sent to the control system in real time until the control system can determine the new predicted landing point by combining all kinds of information and then drive the corresponding pedal to move accordingly to match the new step of the user.

As mentioned above, the coordinates and the attitude of the pedal can be controlled according to the VR scene including moving forward, moving backward, turning, stepping up, stepping down, climbing up, climbing down and other scenes, to match the user's perception of the virtual environment.

Figure 4:
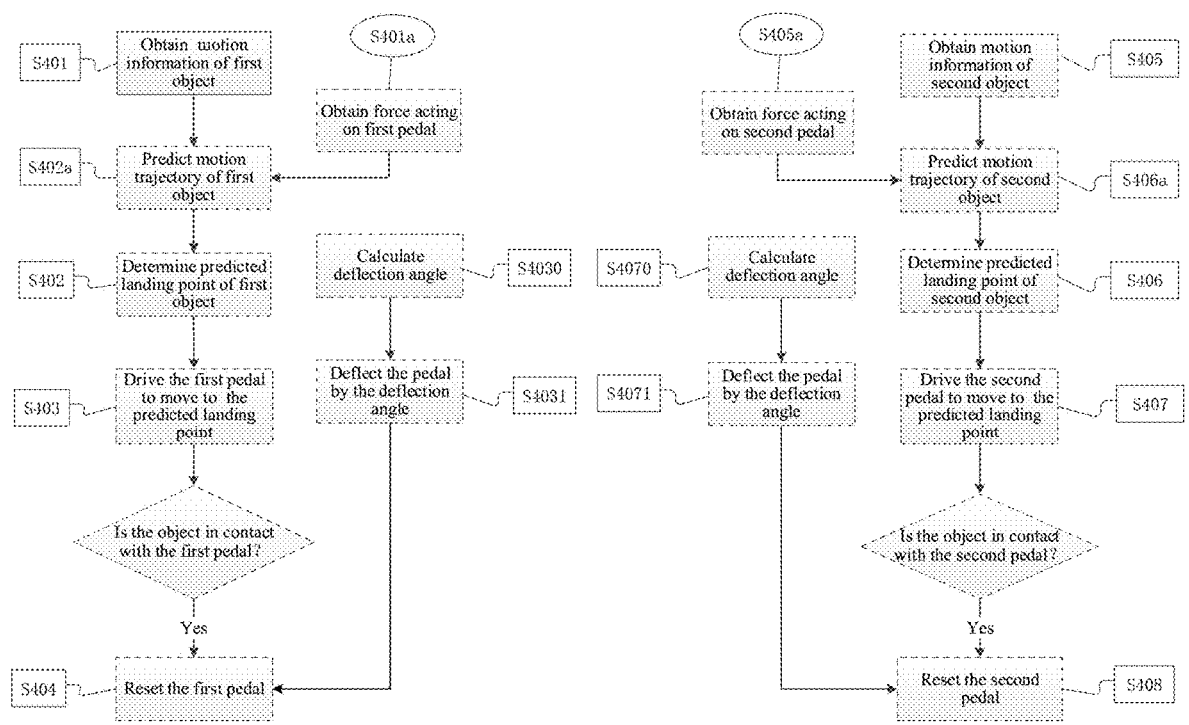
FIG. 4 shows a flow chart of the steps of the VR walking method provided by an embodiment of the present invention.

As can be known from the above, in combination with FIG. 4, the walking method applied to the VR scene provided by the embodiment of the present invention includes the following steps:

S401: obtaining the motion information of the first object;

S402: determining the predicted landing point of the first object according to the motion information of the first object;

S403: driving the first pedal to move to the position corresponding to the predicted landing point of the first object;

S404: after sensing that the first object contacts the first pedal, resetting the first pedal;

S405: after sensing that the second object is detached from the second pedal, obtaining the motion information of the second object;

S406: determining the predicted landing point of the second object according to the motion information of the second object;

S407: driving the second pedal to move to the position corresponding to the predicted landing point of the second object; and S408: after sensing that the second object contacts the second pedal, resetting the second pedal.

In an optional embodiment, before the step S402 of determining the predicted landing point of the first object according to the motion information of the first object, the method may further include:

S401a: obtaining the force acting on the first pedal;

then, the step S402 of determining the predicted landing point of the first object according to the motion information of the first object may include:

S402a: predicting the motion trajectory of the first object according to the obtained force, the position information and the corresponding time information in the motion information of the first object to obtain the predicted landing point.

Accordingly, before the step S406 of determining the predicted landing point of the second object according to the motion information of the second object, the method further includes:

S405a: obtaining the force acting on the second pedal;

then, the step S406 of determining the predicted landing point of the second object according to the motion information of the second object may include:

S406a: predicting the motion trajectory of the second object according to the obtained force, the position information and the corresponding time information in the motion information of the second object to obtain the predicted landing point.

In an optional embodiment, before the step S404 of sensing that the first object contacts the first pedal, the method may further include:

S4030: calculating the deflection angle of the first object according to the position information and the attitude information in the motion information of the first object; and S4031: deflecting the first pedal by the deflection angle.

Accordingly, in an optional embodiment, before the step S408 of sensing that the second object contacts the second pedal, the method may further include:

S4070: calculating the deflection angle of the second object according to the position information and the attitude information in the motion information of the second object; and S4071: deflecting the second pedal by the deflection angle.

As can be known from the above, the embodiments of the present invention provides a VR walking mechanism and a walking method applied to the VR scene. In the embodiments of the present invention, the landing points of the objects are obtained by the sensing device, and the first pedal and the second pedal are respectively driven by the driving mechanism to move according to the landing points to catch the objects. The present invention simulates the feeling of real walking, improves the sense of reality in use, and ensures the safety of the user at the same time.

In an optional embodiment, each pedal of the present invention corresponds to a driving device, so that the first pedal and the second pedal can move without interfering with each other.

In an optional embodiment, the VR walking mechanism provided by the embodiment of the present invention can be provided with various sensors, which can accurately obtain the positions of the feet of the user, thereby improving the calculation accuracy and further increasing the reality for the user. Meanwhile, the VR walking mechanism can be provided with a safety rope to assist in ensuring the safety of the user.

The devices in the embodiments described above are only schematic, wherein the described separate components may be or may not be physically separate, and the components displayed as units may be or may not be physical units, that is, the units can be located in one place or can be distributed over a plurality of network elements. Some or all of the modules can be selected according to the actual needs to achieve the objective of the solution of the embodiment. Those skilled in the art can understand and implement the solution of the embodiment without creative labor.

The embodiments of the various components of the present invention may be implemented by hardware, or by software module running on one or more processors, or in a combination of the hardware and the software module. Those skilled in the art should understand that some or all of the functions of some or all of the components of the server according to the embodiments of the present invention can be realized in practice using a microprocessor or a digital signal processor (DSP). The present invention may also be implemented as programs for some or all of apparatus or devices (e.g., computer programs and computer program products), which is for performing the method described herein. Such programs implementing the present invention may be stored on a computer-readable medium or may have the form of one or more signals. Such a signal can be downloaded from an Internet site, or provided on a carrier signal, or provided in any other form.

Figure 5:
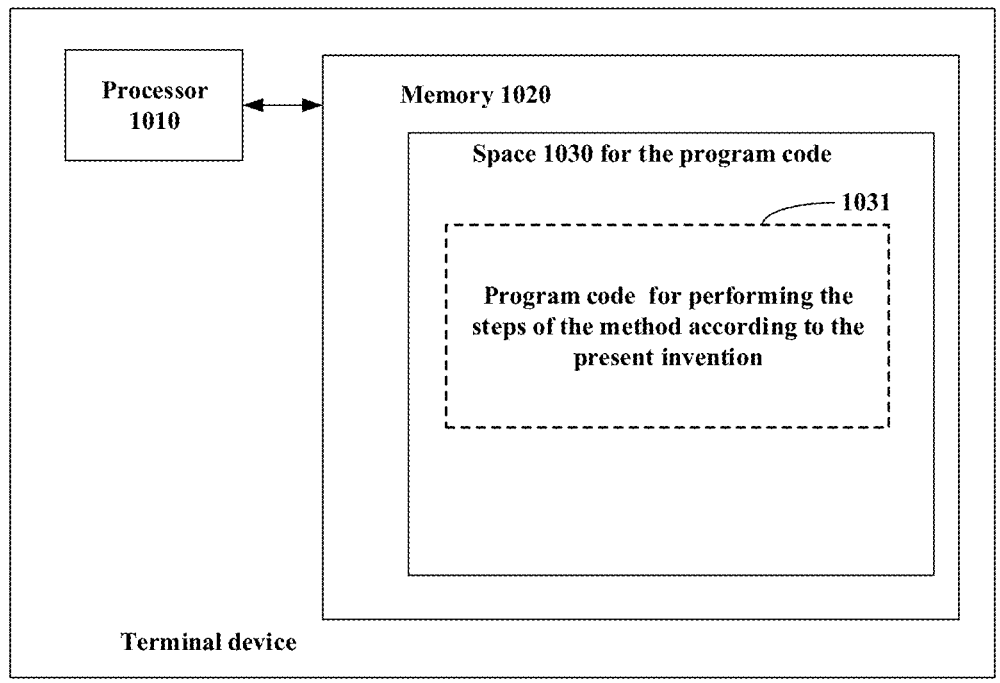
FIG. 5 schematically shows a block diagram of a server for performing the method according to the present invention.
Figure 6:
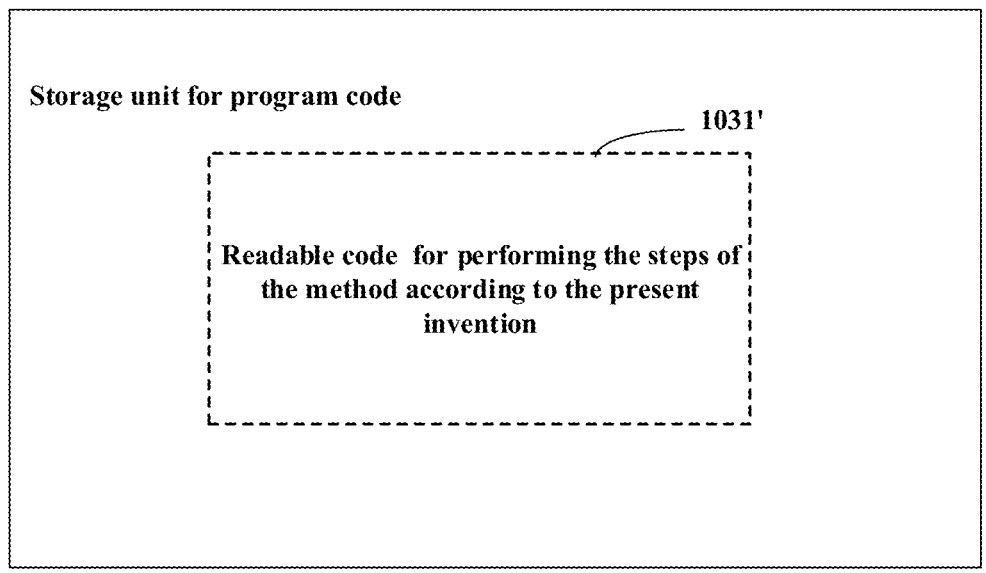
FIG. 6 schematically shows a storage unit for storing or carrying the program code that implements the method according to the present invention.

For example, FIG. 5 shows a server that can implement the walking method applied to the VR scene according to the present invention, such as an application server. The server traditionally includes the processor 1010, and the computer program product or computer-readable medium in the form of the memory 1020. The memory 1020 may be an electronic memory, such as flash memory, electronically erasable programmable read-only memory (EEPROM), electrically programmable read-only memory (EPROM), hard disk, or read-only memory (ROM). The memory 1020 has the storage space 1030 for storing the program code 1031 for performing any of the steps of the method described above. For example, the storage space 1030 for the program code may include all program codes 1031 for implementing the various steps in the above method, respectively. These program codes can be read from one or more computer program products or written into the one or more computer program products. These computer program products include program code carriers, such as hard disk, compact disk (CD), memory card, or floppy disk. Such a computer program product is usually a portable or fixed storage unit as shown in FIG. 6. The storage unit may have storage segments, storage spaces and the like arranged similar to the memory 1020 in the server of FIG. 5. The program code may be compressed, for example, in an appropriate form. Typically, the storage unit includes the computer-readable code 1031', that is, code that can be read by the processor 1010. When run by a server, the code causes the server to perform the steps in the method described above.

As used herein, the terms "one embodiment", "embodiment" or "one or more embodiments" means that particular features, structures or characteristics described in conjunction with the embodiment is included in at least one embodiment of the present invention. In addition, the phrase "in one embodiment" here does not necessarily refer to the same embodiment.

In the present specification provided herein, numerous specific details are explained. It should be understood, however, that the embodiments of the present invention may be practiced without these specific details. In some embodiments, well-known methods, structures, and techniques have not been shown in detail so as not to obscure the understanding of the present specification.

It should be noted that the above embodiments are used to describe the present invention rather than limit the present invention, and that those skilled in the art may design alternative embodiments without departing from the scope of the appended claims. In the claims, any reference sign placed between parentheses shall not be construed as limiting the claims. The word "include/comprise" does not exclude the components or steps that are not listed in the claims. The word "a/an" before a component does not exclude the existence of multiple such components. The present invention can be implemented by means of hardware including a number of different components and by means of a computer with appropriate programming. For any unit with a plurality of devices in the claims, the plurality of devices may be embodied through the same hardware item. The use of the words first, second, third, etc., does not indicate any order, which can be interpreted as names.

In addition, it should be noted that the language used in the present specification is selected primarily for readability and teaching purposes, rather than for the purpose of explaining or limiting the subject matter of the present invention. Therefore, without deviating from the scope and spirit of the appended claims, many modifications and changes are obvious to those skilled in the art. With regard to the scope of the present invention, the disclosure of the present invention is illustrative rather than restrictive, and the scope of the present invention is limited by the appended claims.

Finally, it should be noted that the above embodiments are only used to illustrate the technical solutions of the present invention rather than limit the technical solutions of the present invention. Although the present invention is described in detail with reference to the above embodiments, those skilled in the art should understand that they can still modify the technical solutions recorded in the above embodiments or equivalently replace some of the technical features in the technical solutions recorded in the above embodiments. These modifications or replacements do not deviate the essence of the corresponding technical solution from the spirit and scope of the technical solutions of the embodiments of the present invention.

What is claimed is:

1. A VR walking mechanism, comprising: a first pedal, a second pedal, a sensing device, a control device and a driving device, wherein,
the first pedal and the second pedal are connected to the driving device, respectively;
the sensing device is configured to obtain motion information of a first object and motion information of a second object and send the motion information of the first object and the motion information of the second object to the control device, and each of the motion information of the first object and the motion information of the second object comprises position information; and
the control device determines a predicted landing point of the first object based on the motion information of the first object and a predicted landing point of the second object based on the motion information of the second object, and controls the driving device according to the predicted landing point of the first object and the predicted landing point of the second object to drive the first pedal and the second pedal to move to a position corresponding to the predicted landing point of the first object and a position corresponding to the predicted landing point of the second object;
the driving device corresponding to the first pedal or the second pedal comprises a motor, a lead screw and a connecting member, wherein the connecting member is connected to the first pedal or the second pedal, and the control device is configured to send a control signal to the motor to drive the first pedal or the second pedal to move according to the control signal;
the motor corresponding to the first pedal comprises a first stepper motor and a second stepper motor;
when the first stepper motor receives the control signal of moving in a first direction, the first stepper motor outputs a first torque to drive the lead screw connected to the first stepper motor to rotate, to drive the first pedal to move in the first direction by the lead screw;
when the second stepper motor receives the control signal of moving in a second direction, the second stepper motor outputs a second torque to drive the lead screw connected to the second stepper motor to rotate, to drive the first pedal to move in the second direction by the lead screw;
the first stepper motor is slidably arranged in the VR walking mechanism, and moves as a driven member along with the lead screw connected to the first stepper motor; and
the first pedal resets after sensing that the first object steps on the first pedal, and the second pedal resets after sensing that the second object steps on the second pedal.

2. The VR walking mechanism of claim 1, wherein, each of the first pedal and the second pedal is controlled by the driving device to move in a plane or in a three-dimensional space.

3. The VR walking mechanism of claim 1, wherein, the sensing device comprises a position detection unit and pressure detection units, wherein the pressure detection units are installed on the first pedal and the second pedal, respectively; the control device obtains force information detected by the pressure detection units and determines the predicted landing point of the first object and the predicted landing point of the second object in combination with the motion information of the first object and the motion information of the second object.

4. The VR walking mechanism of claim 1, further comprising a rotation mechanism respectively corresponding to the first pedal and the second pedal, wherein the first pedal and the second pedal rotate through the rotation mechanism in response to a command from the control device.

5. The VR walking mechanism of claim 1, wherein, the sensing device is inherently provided with an attitude sensing function or the sensing device further comprises an attitude sensor to sense attitude information of the first object and attitude information of the second object.

6. A walking method applied to a VR scene, comprising:
obtaining motion information of a first object;
determining a predicted landing point of the first object according to the motion information of the first object;
driving a first pedal to move to a position corresponding to the predicted landing point of the first object;
after sensing that the first object contacts the first pedal, resetting the first pedal;
after sensing that a second object is detached from a second pedal, obtaining motion information of the second object;
determining a predicted landing point of the second object according to the motion information of the second object;
driving the second pedal to move to a position corresponding to the predicted landing point of the second object; and
after sensing that the second object contacts the second pedal, resetting the second pedal, wherein, before the step of determining the predicted landing point of the first object according to the motion information of the first object, the walking method further comprises:

obtaining a force acting on the first pedal;

wherein, the step of determining the predicted landing point of the first object according to the motion information of the first object comprises:

predicting a motion trajectory of the first object according to the force acting on the first pedal, first position information and first time information to obtain the predicted landing point of the first object, wherein the motion information of the first object comprises the first position information and the first time information, and the first time information corresponds to the first position information; and before the step of determining the predicted landing point of the second object according to the motion information of the second object, the walking method further comprises:

obtaining a force acting on the second pedal;

wherein, the step of determining the predicted landing point of the second object according to the motion information of the second object comprises:

predicting a motion trajectory of the second object according to the force acting on the second pedal, second position information and second time information to obtain the predicted landing point of the second object, wherein the motion information of the second object comprises the second position information and the second time information, and the second time information corresponds to the second position information.

7. The walking method of claim 6, wherein, before sensing that the first object contacts the first pedal, the walking method further comprises:

calculating a deflection angle of the first object according to first position information and first attitude information in the motion information of the first object; and deflecting the first pedal by the deflection angle of the first object;

wherein, before sensing that the second object contacts the second pedal, the walking method further comprises:

calculating a deflection angle of the second object according to second position information and second attitude information in the motion information of the second object; and deflecting the second pedal by the deflection angle of the second object.

* * * * *